Jan. 2, 1934.    R. BACHMANN ET AL    1,942,081
WIND MOTOR FOR WELLS
Filed July 9, 1930    2 Sheets-Sheet 1

Inventors:
René Bachmann,
Enrique Alliot

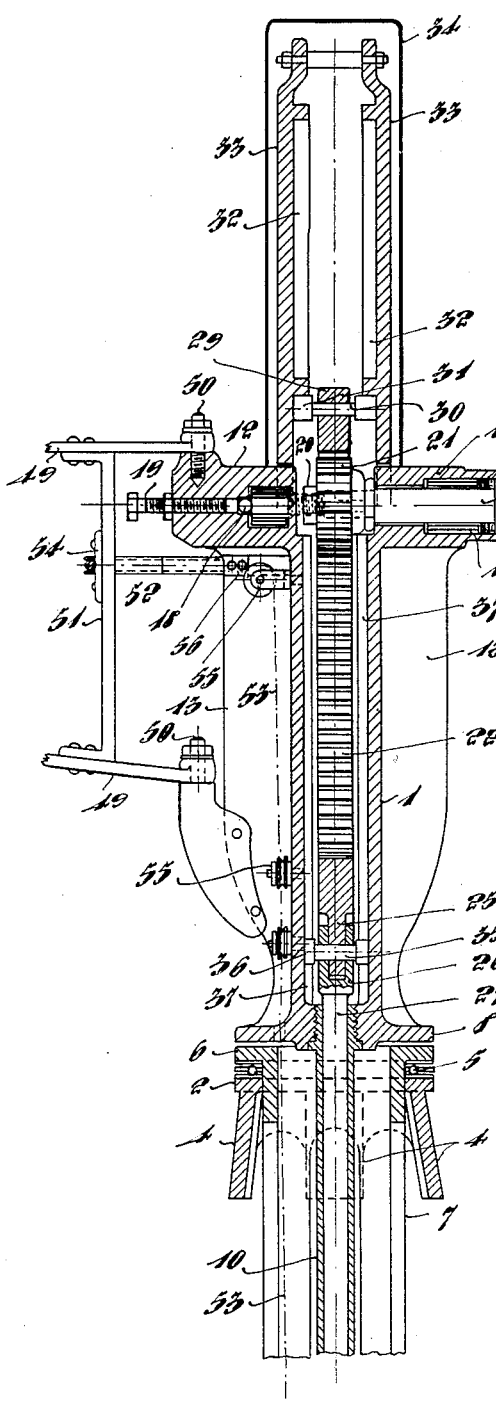

Patented Jan. 2, 1934

1,942,081

UNITED STATES PATENT OFFICE 1,942,081

WIND MOTOR FOR WELLS

René Bachmann and Enrique Alliot,
Buenos Aires, Argentina

Application July 9, 1930, Serial No. 466,809,
and in Argentina May 2, 1930

4 Claims. (Cl. 170—78)

This invention relates to improvements in wind motors for wells and has for an object a device of this kind, consisting of a minimum of operating parts; in which the traction on the piston rod is applied practically in a vertical direction; in which lubrication takes place automatically; which may be constructed at a low cost and wherein the transmission of power and the piston stroke may readily be varied.

A substantial feature of the wind motor according to this invention is the provision of a device for transforming rotary motion to an endwise reciprocating motion. The axle of the paddle wheel carries a pinion gearing with a double rack, formed by an elongated internally toothed part, consisting of two vertical straight sides, joined at the top and bottom, respectively, by two semi-circular sections. The rack is jointed at its lower end to a guide rod moving in a vertical direction. The upper end of the rack is guided in a guide path so designed that the rack will be constantly kept in gear with the pinion in any position. The rack will thus perform a nearly rectilineal reciprocal motion, whereby two alternate strokes of the piston rod at an almost constant speed are obtained. Lateral play being very slight, the yield of the device is improved and any undue wear is avoided; the working parts are very few in number and their lubrication is performed automatically by means of an oil bath arranged within the casing which supports the whole device.

Other features and advantages of the invention will be referred to in the course of the following description.

In order that the invention may be readily understood and carried into practice, the same has been shown, by way of example, in the accompanying illustrative drawings, wherein:—

Figure 3 is a longitudinal vertical section of the same.

Figure 4 illustrates a top plan view of the device, with the parts above the axle removed and the rack shown in cross section.

Figure 5 is a bottom plan view of the wind motor head.

In all the said views, the same numbers of reference have been used to indicate like or corresponding parts.

Figure 1:
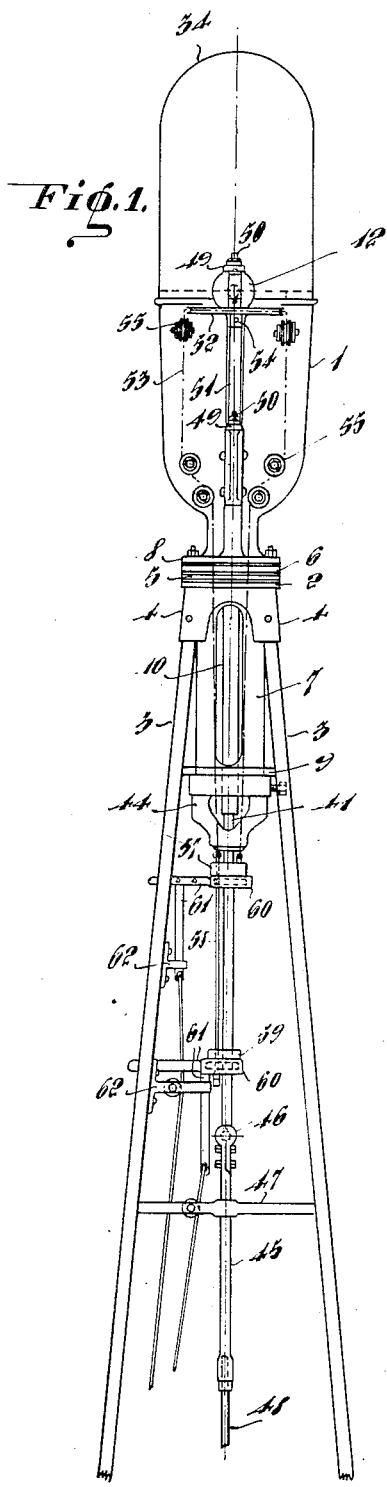
Figure 1 is a fragmentary elevation of the rear side of the wind motor.
Figure 2:
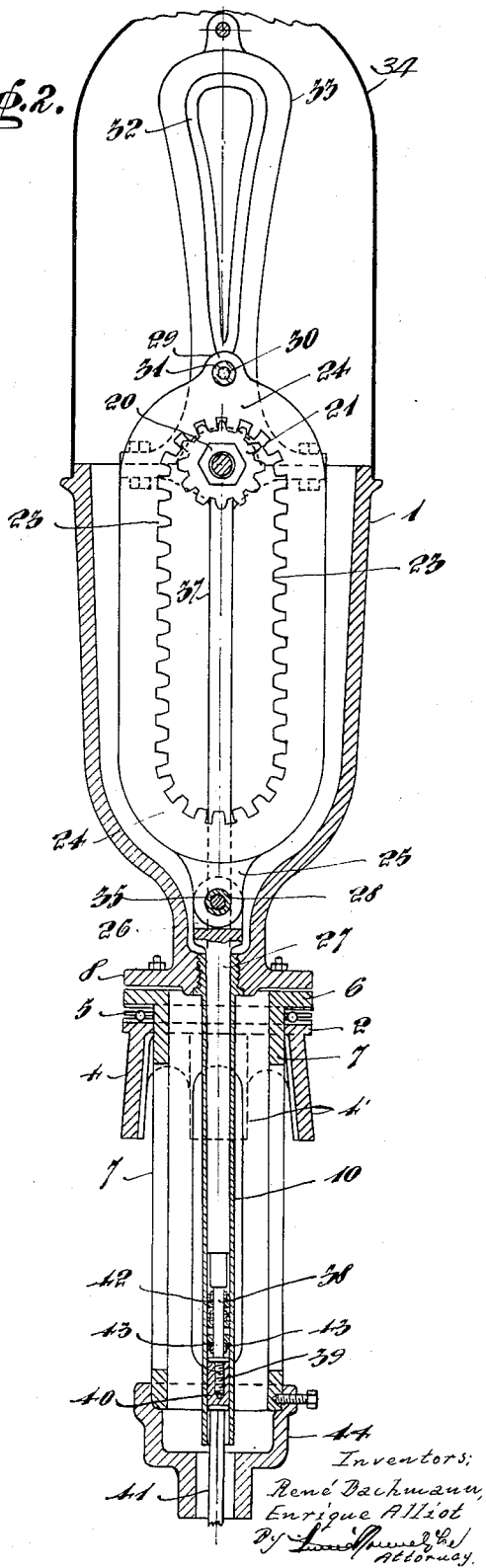
Figure 2 is an enlarged fragmentary vertical section of the same.

The device substantially consists of a casing 1, forming the head and framing for the entire apparatus, rotatably mounted on top of the tower of the wind motor by means of a rotatable support 2, secured to the upper ends of the four standards 3 of the tower by the brackets 4, screwed to said standards. The top of the support is level and is formed with a circular path or groove for containing the antifriction balls 5, for rotatably supporting the flange 6 of a lower extension formed on the casing 1, and to said flange is screwed the base flange 8 of the casing. The extension 7 is cylindrical in shape and fits within the upper end of the tower, so as to maintain the device in a vertical position by means of a sleeve 9, secured to the tower and which surrounds said extension near its lower end and allows the same to rotate.

The casing 1 is of an elongated flattened shape, rectangular in cross section, as clearly shown in Figure 4, so as to form a suitable container of sufficient capacity to permit of the operation of the rack. Its lower end is tapering in a downward direction, and formed with a neck or restricted portion above the base flange 8. The casing 1 is open at its upper and lower ends. The lower opening is a threaded hole into which is screwed the packing sleeve or guide 10 of the piston rod.

Level with its upper opening which forms a horizontal plane, the casing 1 is provided with two bearings 11 and 12, from the lower part of which project the reinforcing ribs 13 which extend to the bottom of the casing.

Within the said bearings are mounted antifriction rollers 14, in which rotates the axle 15 of the paddle wheel; said axle projects beyond the bearing 11 and forms at that point the conical axle 16 for a wind or paddle wheel (not shown), conveniently secured in position by means of a pin or lock nut device (not shown) to said axle. At the front end of the bearing 11 are arranged suitable felt washers 17, to prevent the oil from escaping. At the end of the axle situated within the bearing 12 is arranged a steel ball 18, the position of which may be adjusted by the thumb screw 19, threaded into the closed end of said bearing, its object being to adjust the longitudinal position of the axle and absorb the thrust of the paddle wheel.

On the part of the axle situated between the bearings is mounted the pinion 21, held in position by a pin and lock nut 20. The pinion gears with the oval-shaped rack 22 which properly consists of two parallel straight racks, joined at their ends by the semicircular parts 24, thus resembling a flattened crown with internal gear teeth. When at its two dead points, the rack occupies a vertical position, centered on the vertical shaft of the device. The lower part of the rack is formed with an ear 25, provided with a hole for jointing the same to the forked head 26 of the guide rod 27, by means of a sleeve 28 extending within the holes of said ear and forked head. The upper part of the rack is also provided with an extension or ear 29, through which passes a stud 30, carrying at each side of the ear a small roller 31, adapted to run in two guide ways 32, formed by two vertical plates 33, secured by means of screws to the upper part of the casing. The curve of the guide ways 32, formed by a projecting flange on each plate, determines the course to be followed by the rollers 31, in order to cause the rack to remain in gear with the pinion, while the sleeve 28 of the lower part of the rack is obliged to move along a vertical line.

The upper part of the casing 1 is provided with a cover or hood of sheet iron, indicated at 34 and of the particular shape shown in the drawings, being secured in position by the same screws used to fix the plates 33. Said hood entirely closes the opening of the casing, so as to efficiently protect the device against the influence of weather and dust.

As already stated before, the stud 35 which connects the rack to the guide rod 27, performs its motion along a vertical line, to which end the stud 35 which extends through the sleeve 28, carries on each end a roller 36, adapted to run in a vertical groove 37, formed on the inner face of the front and rear walls of the casing 1, on a longitudinal vertical plane of the device.

The guide rod fits snugly in the guide sleeve 10 which at the same time forms a packing device and is screwed into the base end of the casing 1. On the end of the rod is formed a threaded extension 38, on which is screwed at 39, the cylindrical end 40 of a rod 41, of square section. This connection serves to support a series of three leather washers 42, separated from each other by metal washers 43. The upper leather washers have their rim bent upwards, while that of the lower washer is bent in a downward direction. The purpose of this arrangement is to entirely intercept any oil flowing from the casing.

The lower end of the extension 7 of the casing is provided with a cap 44, secured in position by a thumb screw and formed at its end with a square opening which serves as a guide hole for the rod 41. This rod is linked to another rod 45, of square cross section, by means of a ball joint 46, by means of which arrangement the two rods may perform a relative rotary motion, as the former of them is caused to rotate with the device, while the latter remains stationary as regards the direction of rotation. For this purpose, the rod 45 is guided by a part 47, integral with the tower and provided with a square hole for the passage of said rod which may thus slide therein without turning. To this latter rod is connected the piston rod 48 of the pump.

The tail device or vane of the wind motor comprises the usual vane, of which only the arm, consisting of two iron plates 49 with perforated ends for hinging the same to the hinges 50, formed integral with the casing of the device. The cross stay 51 which connects said arms 49, carries a horizontal circular part 52, of three quarters of a circumference, provided with a groove for guiding the cable 53, secured to said part by means of a stud or clevis 54 and the two ends of which pass over the guiding sheaves 55, secured to the casing 1, and after passing through holes formed in the flange 6, they pass between the part 7 and the packing sleeve 10. On each side of the rear reinforcing rib 13 of the casing 1 is mounted a spring 56; one of these springs acts as a buffer for the semicircular part 52 when the vane is in its operative position, while the other spring 56 acts as a buffer for the quarter of circle of the part 52 opposite to the semicircle when the vane is in its closed or inoperative position.

For operating the cables 53 which turn with the wind motor, from a stationary part of the tower, said cables are connected at their ends, the one directly to a collar 57, formed with a square hole, and the other to a rod 58 adapted to slide freely within said collar and secured in turn to a similar collar 59. Both collars slide on the square rod 41 and turn together with the same. It will thus be seen that when one collar rises, the other will descend and vice-versa, and in order to not interfere with each other, one collar is arranged slightly above the other. Each collar is surrounded by a ring 60 which, while retaining the same in an endwise direction, allows the collar to rotate while the ring remains stationary. Each ring in turn is mounted within an angular support 61, having a vertical arm arranged to slide within the guide 62, secured to the tower. The object of this device is to only allow of a vertical displacement of the aforesaid rings. To the angular supports are attached the operating cables for starting and stopping the wind motor, to be acted upon either by hand or automatically, as may be desired.

A detailed description of the said operating device has been deemed unnecessary.

With regard to the operation of the wind motor, the action of the pinion on the rack which consists of two alternate, practically vertical strokes, interrupted by a small horizontal motion at the dead centres, will readily be understood.

In an apparatus of this construction, a piston stroke of any desired length may be obtained, as well as any multiplication of power, by simply varying the diameter of the pinion or the length of the rack.

A perfect lubrication of the operating parts is secured by the oil bath contained within the casing 1.

It will be evident that the construction and minor details of the invention may be varied in several ways without departing from the scope and essential features thereof, to be clearly set forth in the final claims hereto annexed.

Having now particularly described and ascertained the nature of our said invention and in what manner the same is to be performed, we declare that what we claim is:—

1. A wind motor, comprising a head forming a closed lubricant retaining casing open at its bottom, a vertical reciprocatory coupling rod operating through and closing the opening, a windwheel driven shaft journaled in the head, a pinion on said shaft, an endless double rack formed by two straight parallel portions joined at their upper and lower ends by two semicircles, the lower portion of the rack being directly joined to the upper portion of the vertical reciprocatory coupling rod, means for constraining the path of movement of the lower portion of the rack, which is directly joined to the reciprocatory coupling rod, in a straight vertical line, means for guiding the upper portion of the rack so that the rack meshes at all times with the pinion on the shaft, a sleeve secured in the opening in the lower portion of the casing and depending from the bottom of the casing, said sleeve encasing the reciprocatory coupling rod, a portion of said coupling rod being of reduced cross section, and packing material carried by the reduced portion of the coupling rod and cooperating with the interior surface of the sleeve to provide a leak-proof joint between the sleeve and coupling rod.

2. A wind motor, comprising a head forming a closed lubricant retaining casing open at its bottom, a vertical reciprocatory coupling rod operating through and closing the opening, a windwheel driven shaft journaled in the head, a pinion on said shaft, an endless double rack formed by two straight parallel portions joined at their upper and lower ends by two semicircles, the lower portion of the rack being directly joined to the upper portion of the vertical reciprocatory coupling rod, means for constraining the path of movement of the lower portion of the rack, which is directly joined to the reciprocatory coupling rod, in a straight vertical line, means for guiding the upper portion of the rack so that the rack meshes at all times with the pinion on the shaft, a sleeve secured in the opening in the lower portion of the casing and depending from the bottom of the casing, said sleeve encasing the reciprocatory coupling rod, and packing material between the rod and sleeve.

3. A wind motor, comprising a head forming a closed lubricant retaining casing open at its bottom, a vertical reciprocatory coupling rod operating through and closing the opening, a windwheel driven shaft journaled in the head, a pinion on said shaft, an endless double rack formed by two straight parallel portions joined at their upper and lower ends by two semicircles, the lower portion of the rack being directly joined to the upper portion of the vertical reciprocatory coupling rod, means for constraining the path of movement of the lower portion of the rack, which is directly joined to the reciprocatory coupling rod, in a straight vertical line, means for guiding the upper portion of the rack so that the rack meshes at all times with the pinion on the shaft, a sleeve secured in the opening in the lower portion of the casing and depending from the bottom of the casing, said sleeve encasing the reciprocatory coupling rod, a portion of said coupling rod being of reduced cross section, and a plurality of leather washers carried by the reduced portion of the coupling rod and cooperating with the interior surface of the sleeve to provide a leak-proof joint between the sleeve and coupling rod.

4. A wind motor, comprising a head forming a closed lubricant retaining casing open at its bottom, a vertical reciprocatory coupling rod operating through and closing the opening, a windwheel driven shaft journaled in the head, a pinion on said shaft, an endless double rack formed by two straight parallel portions joined at their upper and lower ends by two semicircles, the lower portion of the rack being directly joined to the upper portion of the vertical reciprocatory coupling rod, means for constraining the path of movement of the lower portion of the rack, which is directly joined to the reciprocatory coupling rod, in a straight vertical line, means for guiding the upper portion of the rack so that the rack meshes at all times with the pinion on the shaft, the interior walls of said casing having straight vertical grooves formed therein, and rollers carried by the lower portion of the rack and positioned in said grooves for restricting the movement of the lower portion of the rack to a straight vertical path.

RENÉ BACHMANN.
ENRIQUE ALLIOT.